(12) United States Patent
Goto et al.

(10) Patent No.: US 9,871,952 B2
(45) Date of Patent: Jan. 16, 2018

(54) IMAGE FORMATION APPARATUS FORMING A TEST PATTERN IMAGE

(71) Applicant: Oki Data Corporation, Tokyo (JP)

(72) Inventors: Takuya Goto, Tokyo (JP); Fumitaka Ozeki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/159,039

(22) Filed: May 19, 2016

(65) Prior Publication Data
US 2017/0006187 A1    Jan. 5, 2017

(30) Foreign Application Priority Data

Jun. 30, 2015 (JP) ................................. 2015-131519

(51) Int. Cl.
*H04N 1/60* (2006.01)
*H04N 1/405* (2006.01)

(52) U.S. Cl.
CPC ........... *H04N 1/6008* (2013.01); *H04N 1/405* (2013.01); *H04N 1/6033* (2013.01); *H04N 2201/0005* (2013.01); *H04N 2201/0094* (2013.01)

(58) Field of Classification Search
CPC .. H04N 1/6033; H04N 1/6036; H04N 1/6038; H04N 1/6041; H04N 1/6044; H04N 1/6047
See application file for complete search history.

(56) References Cited

U.S. PATENT DOCUMENTS

| | | | |
|---|---|---|---|
| 2009/0027730 A1* | 1/2009 | Monga ................... | G06K 15/02 358/3.06 |
| 2012/0120428 A1* | 5/2012 | Henderson ........... | H04N 1/6038 358/1.13 |
| 2014/0293303 A1* | 10/2014 | Nakamura ................ | B41J 3/54 358/1.12 |
| 2015/0249752 A1* | 9/2015 | Imai ................... | H04N 1/00042 358/1.15 |
| 2017/0066268 A1* | 3/2017 | Kyoso ..................... | B41J 2/155 |

FOREIGN PATENT DOCUMENTS

JP      2005-079937 A     3/2005

* cited by examiner

*Primary Examiner* — Christopher D Wait
(74) *Attorney, Agent, or Firm* — Metrolexis Law Group, PLLC

(57) ABSTRACT

An image formation apparatus includes: a storage which stores a test pattern; and image formation sections which form an image of the test pattern on a medium. The image of the test pattern includes divided images formed by being divided into regions in a main scanning direction and a sub-scanning direction. Each of the divided images is formed by at least one preset image formation section out of the image formation sections. A total width, in each of the main scanning direction and the sub-scanning direction, of the divided images formed by each of the image formation sections is larger than the entirety of a corresponding width of the image of the test pattern.

20 Claims, 12 Drawing Sheets

IMAGE FORMATION APPARATUS FORMING A TEST PATTERN IMAGE

CROSS REFERENCE TO RELATED APPLICATIONS

This application claims priority based on 35 USC 119 from prior Japanese Patent Application No. 2015-131519 filed on Jun. 30, 2015, entitled "IMAGE FORMATION APPARATUS", the entire contents of which are incorporated herein by reference.

BACKGROUND OF THE INVENTION

1. Field of the Invention

The disclosure is related to an image formation apparatus.

2. Description of Related Art

Among conventional image formation apparatuses such as a printer, a copier, a facsimile, and multifunction peripherals, the printer, for example, is configured to print a test pattern on paper as a medium when the image quality of the printer degrades, and to enable a user to check the image of the test pattern (see Japanese Patent Application Publication No. 2005-79937, for example).

SUMMARY OF THE INVENTION

However, the conventional printer has a problem in that it is still difficult to recognize which part of the printer has a defect even by checking the image of the test pattern.

An object of a first embodiment of the invention is to enable recognition of a defective part of an image formation apparatus only by checking an image of a test pattern.

An aspect of the invention is an image formation apparatus that includes: a storage which stores a test pattern; and image formation sections which form an image of the test pattern on a medium. The image of the test pattern includes divided images formed by being divided into regions in a main scanning direction and a sub-scanning direction. Each of the divided images is formed by at least one preset image formation section out of the image formation sections. A total width, in each of the main scanning direction and the sub-scanning direction, of the divided images formed by each of the image formation sections is larger than the entirety of a corresponding width of the image of the test pattern.

According to these aspects of the invention, the image of the test pattern includes the divided images formed by being divided into multiple regions in the main scanning direction and the sub-scanning direction; and, each of the divided images is formed by a preset image formation section out of the multiple image formation sections. Therefore, a manipulator can easily recognize which part of the image formation apparatus has a defect only by checking the image of the test pattern.

In addition, the widths in the main scanning direction and the sub-scanning direction of the divided images formed by each of the image formation sections are set to cover the entities of the corresponding widths of the image of the test pattern. Therefore, a manipulator can surely recognize which part of the image formation apparatus has a defect.

DETAILED DESCRIPTION OF EMBODIMENTS

Hereinafter, embodiments of the invention are described in detail with reference to the drawings. In this case, a printer is described as an image formation apparatus.

Figure 2:
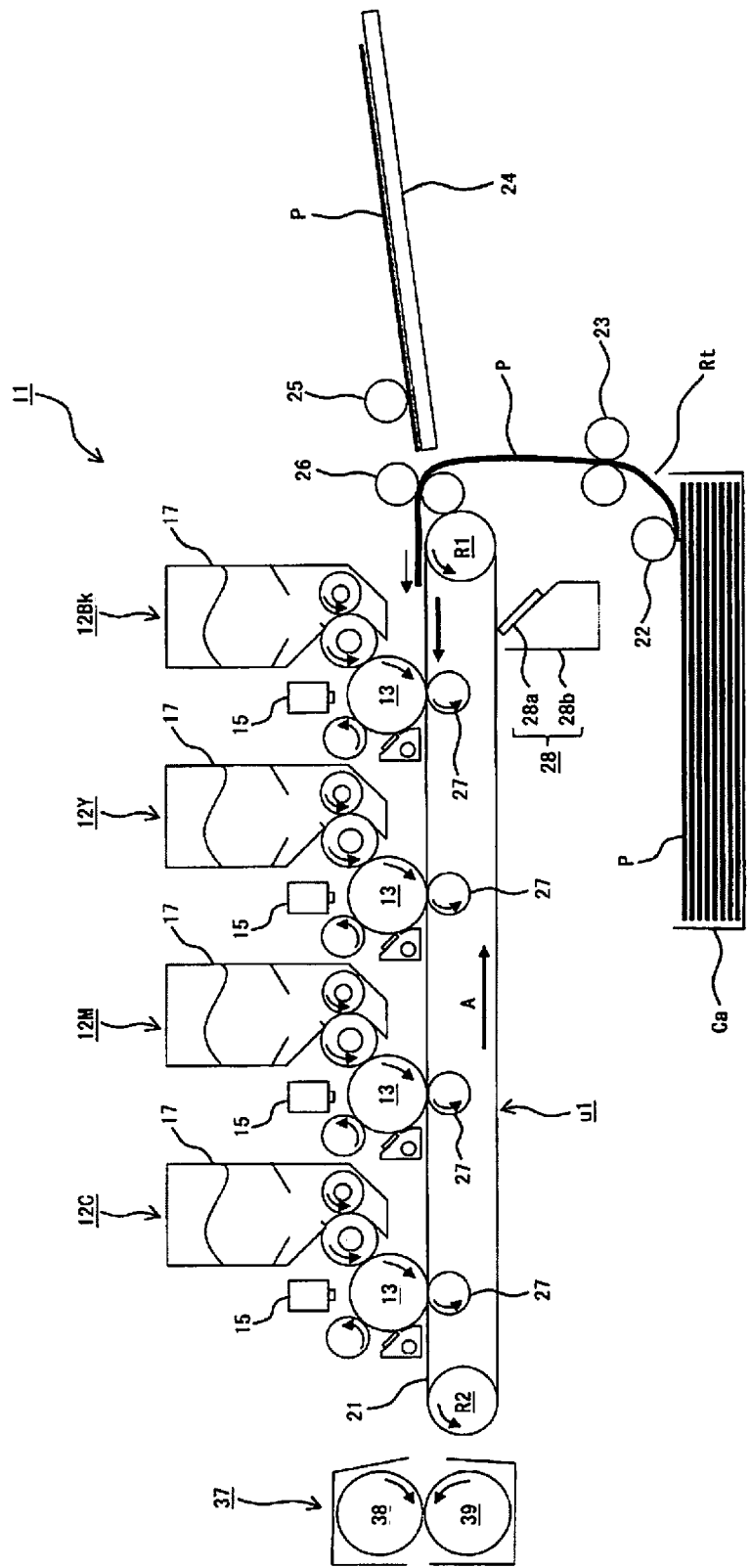
FIG. 2 is a conceptual view of the printer according to the first embodiment of the invention.
Figure 3:
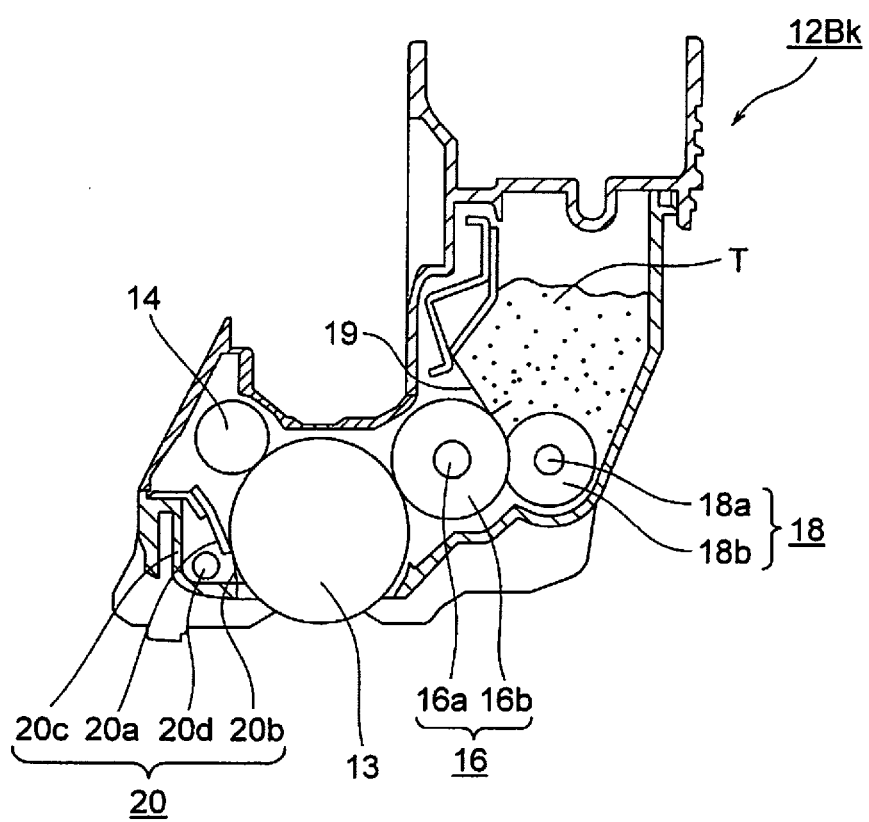
FIG. 3 is a schematic view of an image formation unit according to the first embodiment of the invention.

FIG. 2 is a conceptual view of a printer according to a first embodiment of the invention, and FIG. 3 is a schematic view of an image formation unit according to the first embodiment of the invention. Here, since configurations of image formation units 12Bk, 12Y, 12M, and 12C are the same, only image formation unit 12Bk is illustrated in FIG. 3.

In FIG. 2, 11 indicates the printer. Printer 11 includes multiple, four in this embodiment, image formation units 12Bk, 12Y, 12M, and 12C which respectively constitute independent image formation sections, and which are arranged along a route for transporting paper P as a medium, that is, along medium transport route Rt. Image formation units 12Bk, 12Y, 12M, and 12C form toner images as developer images of the respective colors of black, yellow, magenta, and cyan. It should be noted that even though plain paper is used as paper P in the embodiment, any paper other than plain paper, such as an OHP sheet, an envelope, copying paper, or special paper, is also available.

Each of image formation units 12Bk, 12Y, 12M, and 12C includes: photoreceptor drum 13 as an image carrier formed in a drum shape and including an organic photoreceptor on a surface thereof; charge roller 14 as a charge device which is arranged in contact with photoreceptor drum 13, and which uniformly charges the surface of photoreceptor drum 13; development roller 16 as a developer carrier which is arranged in contact with photoreceptor drum 13, and which forms a toner image of the corresponding color by attaching toner T as a developer onto an electrostatic latent image as a latent image formed on the surface of photoreceptor drum 13; toner supply roller 18 as a developer supply member which is arranged in pressure contact with development roller 16, and which supplies development roller 16 with toner T supplied from toner cartridge 17; development blade 19 as a developer regulation member which is arranged with its tip end put in pressure contact with development roller 16, and which forms toner T supplied from toner supply roller 18 into a thin layer; cleaning device 20 which removes and collects toner T left on the surface of photoreceptor drum 13 after a transfer; and the like.

Development roller 16 includes: shaft 16a made of metal and having a diameter of 10 mm; and elastic layer 16b which is arranged around an outer circumference of shaft 16a and has a 3 mm thickness. Elastic layer 16b is made of a semi-conductive elastic material, that is, a silicone rubber with a rubber hardness (Asker C) of 60° in the embodiment. Additionally, the surface of elastic layer 16b is subjected to predetermined treatments to adjust a friction coefficient, surface roughness, charge properties, or the like.

Meanwhile, toner supply roller 18 includes: shaft 18a made of metal and having a diameter of 6 mm; and foam 18b arranged around an outer circumference of shaft 18a and having a 4.75 mm thickness. In the embodiment, foam 18b is made of silicone foam with a hardness (Asker F) of 50°.

Development roller 16 and toner supply roller 18 are disposed in pressure contact with each other and rotate in the same direction. In a contact portion of development roller 16 and toner supply roller 18, the surfaces of development roller 16 and toner supply roller 18 are moved in opposite directions.

Development blade 19 is made of a 0.08 mm thick metal material having a flexibility (spring properties), that is, SUS304 in the embodiment. A portion of development blade 19 around its tip end is bent into an L shape and an edge portion, which is the bent portion of the L shape, is in pressure contact with development roller 16.

Cleaning device 20 includes: cleaning blade 20a as a first cleaning member which is arranged with its tip end put in pressure contact with photoreceptor drum 13, and which scrapes toner T left on the surface of photoreceptor drum 13; drum film 20b which prevents toner T scraped by cleaning blade 20a from dropping onto medium transport route Rt; toner case 20c which stores scraped toner T; and conveyance spiral 20d which conveys toner T stored in toner case 20c to toner cartridge 17.

Additionally, LED head 15 as an exposure device is arranged above and opposed to photoreceptor drum 13 of each of image formation units 12Bk, 12Y, 12M, and 12C. Each LED head 15 includes LEDs as light-emitting elements, a lens array, and the like, and is configured to emit light in printing dot units according to image data of the corresponding color to photoreceptor drum 13, thereby exposing the surface of photoreceptor drum 13 to the light to decrease the potential of the exposed portions, and thus forming the electrostatic latent image.

Moreover, transfer unit u1 is arranged under photoreceptor drums 13 of image formation units 12Bk, 12Y, 12M, and 12C.

Transfer unit u1 includes: drive roller R1 which is rotatably arranged on an upstream side (image formation unit 12Bk side) in a paper P transport direction and is rotated by receiving a rotation of a later-described driver motor 31 (FIG. 1) as a drive source; driven roller R2 which is rotatably arranged on a downstream side (image formation unit 12C side) in the paper P transport direction and is rotated with a rotation of drive roller R1; transfer belt 21 as a circulating member which is stretched out around drive roller R1 and driven roller R2 in a manner capable of circulating, and is circulated with the rotation of drive roller R1 in an arrow A direction; transfer rollers 27 as transfer members which are arranged in contact with (opposed to) respective photoreceptor drums 13 across transfer belt 21, and which each transfers the toner image of the corresponding color by applying a voltage to transfer belt 21 to charge paper P to the polarity opposite to that of toner T; and cleaning device 28 which is arranged close to drive roller R1 on the downstream side of driven roller R2 in the circulating direction of transfer belt 21, and which removes toner T adhering to transfer belt 21.

Cleaning device 28 includes: cleaning blade 28a as a second cleaning member which is arranged with its tip end put in pressure contact with transfer belt 21, and which scrapes toner T adhering to transfer belt 21; and toner case 28b which stores scraped toner T.

Furthermore, first and second paper feed mechanisms are provided to the main body of printer 11 to feed paper P to medium transport route Rt. The first and second paper feed mechanisms are arranged at a lower portion inside of the apparatus main body and at a side portion outside of the apparatus main body.

The first paper feed mechanism includes: paper cassette Ca which is arranged in the lower portion inside of the apparatus main body and which serves as a first medium loading section and a medium storage for storing paper P; pickup roller 22 which is rotatably arranged on a front end of paper cassette Ca, and which separately picks up and feeds each sheet of paper P to medium transport route Rt; a pair of paper feed rollers 23 which are arranged close to and downstream of pickup roller 22, and which transport paper P; and the like.

The second paper feed mechanism includes: manual feed tray 24 which is arranged outside of the apparatus main body, and which serves as a second medium loading section on which to load paper P; pickup roller 25 which is rotatably arranged on a front end of manual feed tray 24, and separately picks up and feeds each sheet of paper P to medium transport route Rt; and the like.

Additionally, a pair of registration rollers 26 are arranged upstream of image formation unit 12Bk on medium transport route Rt. The pair of registration rollers 26 temporarily stops paper P transported from the first or second paper feed mechanism and correct a skew of paper P.

Moreover, fuser unit 37 as a fuser device is arranged downstream of image formation unit 12C on medium transport route Rt. Fuser unit 37 includes: heat roller 38 as a first fixing roller; and pressure roller 39 as a second fixing roller.

Furthermore, an unillustrated pair of transport rollers are arranged downstream of fuser unit 37 on medium transport route Rt, an unillustrated delivery roller is arranged downstream of the pair of transport rollers, and an unillustrated stacker for stacking paper P delivered from the delivery roller is arranged outside of the apparatus main body.

Next, toner T used in the embodiment is described.

In the embodiment, as toner T, negatively-charged grinded toners are used. More specifically, the grinded toners are prepared by using a binding resin made of polyester, and colorants such as carbon black, a copper phthalocyanine pigment (C.I. Pigment Blue 15), and quinacridone-based pigments (C.I. Pigment Red 22, and C.I. Pigment Yellow 85).

A mean volume diameter of toner T is 5.8 µm, and an additive is externally added to toner base particles to adjust flow properties, charge properties, storage stability, durability, and the like of toner T.

As the additive, for example, titanium oxide, alumina, acrylic (PMMA), silica, or the like is used. As the silica, silica with silicone oil treatment or disilazane-modified silica is used. The additive contains a mixture of particles with different primary particle diameter sizes such as 7 nm, 12 nm, 14 nm, 21 nm, 40 nm, and 200 nm to 300 nm, and is mixed with and added to the toner base particles by a mixer such as Turbula Mixer or Henschel mixer.

Next, a control device of printer 11 is described.

Figure 1:
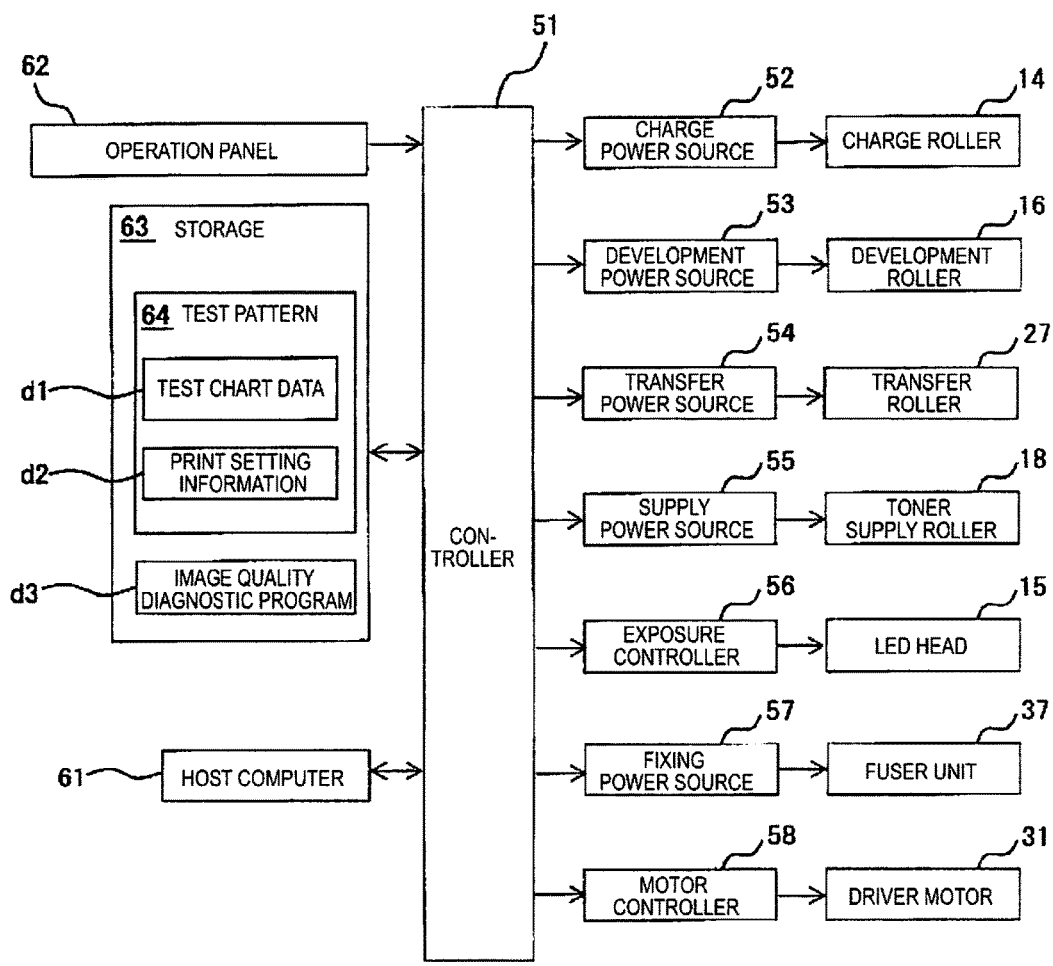
FIG. 1 is a control block diagram of a printer according to a first embodiment of the invention.

FIG. 1 is a control block diagram of the printer according to the first embodiment of the invention. Note that host computer 61 as a higher-level device connected to printer 11 (FIG. 2) is also illustrated in FIG. 1 for convenience of the description.

In FIG. 1, 51 indicates a controller which controls the entire printer 11; 52 indicates a charge power source as a first power source which charges photoreceptor drum 13 (FIG. 2) by applying a voltage to charge roller 14; 53 indicates a development power source as a second power source which causes toner T to adhere to photoreceptor drum 13 by applying a voltage to development roller 16; 54 indicates a transfer power source as a third power source which transfers the toner image to transfer belt 21 by applying a voltage to transfer roller 27; 55 indicates a supply power source as a fourth power source which supplies toner T to development roller 16 by applying a voltage to toner supply roller 18; 56 indicates an exposure controller which forms the electrostatic latent image on the surface of the photoreceptor drum 13 by sending the image data to LED head 15; 57 is a fixing power source as a fifth power source which heats an unillustrated heater arranged in heat roller 38 of fuser unit 37; and 58 is a motor controller which drives driver motor 31 to rotate rollers such as photoreceptor drum 13, charge roller 14, development roller 16, toner supply roller 18, pickup rollers 22 and 25, the pair of paper feed rollers 23, the pair of registration rollers 26, transfer roller 27, heat roller 38, pressure roller 39, the pair of transport rollers, and the delivery roller.

In addition, 61 indicates the host computer connected to printer 11 through a wired or wireless connection; 62 indicates an operation panel as a notifier which notifies a manipulator of predetermined information; 63 indicates a storage which stores therein various kinds of data, programs, and the like.

Host computer 61 creates printing data to perform the printing in printer 11, and sends the printing data to printer 11. Operation panel 62 functions as a manipulation unit through which the manipulator inputs predetermined information to printer 11 by manipulating an unillustrated manipulation panel and the like. Operation panel 62 also functions as a display unit that notifies the manipulator of the predetermined information of printer 11 by showing the predetermined information on an unillustrated display or the like.

Controller 51 performs printing based on an instruction received from host computer 61 and operation panel 62.

Next, operations of printer 11 are described.

When printer 11 receives the printing data and an instruction to start printing from host computer 61, controller 51 causes motor controller 58 to drive driver motor 31, and thereby to rotate: photoreceptor drums 13, charge rollers 14, development rollers 16, and toner supply rollers 18 in image formation units 12Bk, 12Y, 12M, and 12C; drive roller R1, driven roller R2, and transfer roller 27 in transfer unit u1; and heat roller 38 and pressure roller 39 in fuser unit 37. These rotations cause transfer belt 21 to circulate. In addition, controller 51 applies the voltages to: charge roller 14 by controlling charge power source 52; development roller 16 by controlling development power source 53; transfer roller 27 by controlling transfer power source 54; and toner supply roller 18 by controlling supply power source 55. Moreover, controller 51 sends the printing data received from host computer 61 to exposure controller 56. Exposure controller 56 converts the printing data into the image data and sends the image data to LED head 15. Furthermore, controller 51 heats the heater arranged in heat roller 38 of fuser unit 37 by controlling fixing power source 57.

The above operation uniformly charges the surface of photoreceptor drum 13 by applying the voltage to charge roller 14, and forms the electrostatic latent image corresponding to the image data on the surface of photoreceptor drum 13 with a light emission from LED head 15.

Meanwhile, toner T on toner supply roller 18 is supplied to development roller 16 by applying the voltage to toner supply roller 18. At that time, toner T is charged because of friction against toner supply roller 18, friction against a voltage difference, and a voltage difference between toner supply roller 18 and development roller 16. Then, toner T supplied to development roller 16 from toner supply roller 18 is formed into a thin layer by development blade 19, and thereby the toner layer is formed on the surface of development roller 16. Subsequently, with the rotation of development roller 16, toner T is sent to a contact portion of development roller 16 with photoreceptor drum 13.

Toner T in the contact portion is adhered to photoreceptor drum 13 by the voltage applied to development roller 16. Then, the electrostatic latent image formed on the surface of photoreceptor drum 13 is reversely developed and the toner image is thus formed. Here, toner T on development roller 16 which is not used is returned to the contact portion of development roller 16 and toner supply roller 18 with the rotation of development roller 16, and a part of toner T is scraped and collected by friction against toner supply roller 18. The rest of toner T remains on development roller 16 and is sent to the contact portion of development roller 16 and photoreceptor drum 13 to be used for a development again.

When the rollers such as pickup rollers 22 and 25, pair of paper feed rollers 23, pair of registration rollers 26, and the delivery roller are rotated by driving driver motor 31, paper P stored in paper cassette Ca is picked up and fed to medium transport route Rt by pickup roller 22, transported by the pair of paper feed rollers 23, is registered for skew correction by the pair of registration rollers 26, and subsequently fed by transfer belt 21 to a transfer section formed between transfer rollers 27 and photoreceptor drums 13 of image formation units 12Bk, 12Y, 12M, and 12C. At that time, toner images of the four colors formed on respective photoreceptor drums 13 are sequentially transferred to paper P on top of one another by the voltages applied to transfer rollers 27, and a color toner image is formed on paper P.

Meanwhile, in the case of forming an image on paper P loaded on manual feed tray 24, paper P is picked up and fed to medium transport route Rt by pickup roller 25, is registered for skew correction by the pair of registration rollers 26, and is subsequently fed to the transfer section by transfer belt 21.

Paper P is subsequently sent to fuser unit 37, and the toner of the color toner image on paper P is heated by heat roller 38 and pressed by pressure roller 39 in fixing unit 37 to thereby permeate among the fibers of paper P. Thus, the color toner image is fixed on paper P and thereby a color image is formed.

After being transported by the pair of transport rollers, paper P with the color image formed thereon is delivered outside of the apparatus main body by the delivery roller and is stacked on the stacker.

Thereafter, controller 51 starts the next color image formation if there is printing data, and ends the printing operation if there is no printing data. Printing by printer 11 is performed in the way described above.

Incidentally, a few amounts of toner T, the external additive peeled off from toner T, and the like are left on the surface of photoreceptor drum 13 after the transfer. The remaining toner T, external additive, and the like are scraped off by cleaning blade 20a, and are conveyed to and collected by toner cartridge 17. Toner T adhered to transfer belt 21 at the transfer is scraped off by cleaning blade 28a and held in toner case 28b.

Note that, when the manipulator replaces consumables such as a toner cartridge (FIG. 2) or removes paper P from the apparatus main body at the occurrence of a paper jam, LED head 15, for example, may get dirty with toner T and the like.

In this case, since the portion of LED head 15 smeared with toner T cannot perform normal exposure of photoreceptor drum 13, a white streak occurs in each part of the color image corresponding to the portion of LED head 15 smeared with toner T, and the image quality degrades.

To address this, in the embodiment, when the image quality in a part of an image degrades due to the occurrence of a white streak or the like, a cause for the degradation in the image quality can be identified by printing a predetermined test pattern set in advance, and then checking, as a diagnostic image, the printed image of the test pattern, that is, a test pattern image (test chart).

To this end, storage 63 stores test pattern 64 and image quality diagnostic program d3 as a program for printing test pattern 64. Test pattern 64 includes test chart data d1 which is image data as image information to form the test pattern image, and print setting information d2 which is to be used to print test pattern 64 in printer 11 and is for setting paper P' (FIG. 4) described below.

Print setting information d2 is setting information to print test pattern 64, and contains: a type of paper P' for printing test pattern 64; a medium loading section where paper P' is loaded; and an orientation to set paper P', that is, a set orientations. The types of paper P' include sizes and materials of paper P'. In the embodiment, A4 plain paper for the type of paper P', manual feed tray 24 for the medium loading section to set paper P', and a landscape orientation for the set orientation are set in advance. Print setting information d2 is set in advance in a production stage of printer 11, and therefore cannot be changed by the manipulator.

Incidentally, besides test pattern 64 and image quality diagnostic program d3, storage 63 stores an image formation program to perform normal printing, and stores setting information and the like to operate charge power source 52, development power source 53, transfer power source 54, supply power source 55, exposure controller 56, fixing power source 57, motor controller 58, and the like.

Next, test pattern images obtained by printing test pattern 64 are described.

Figure 4:
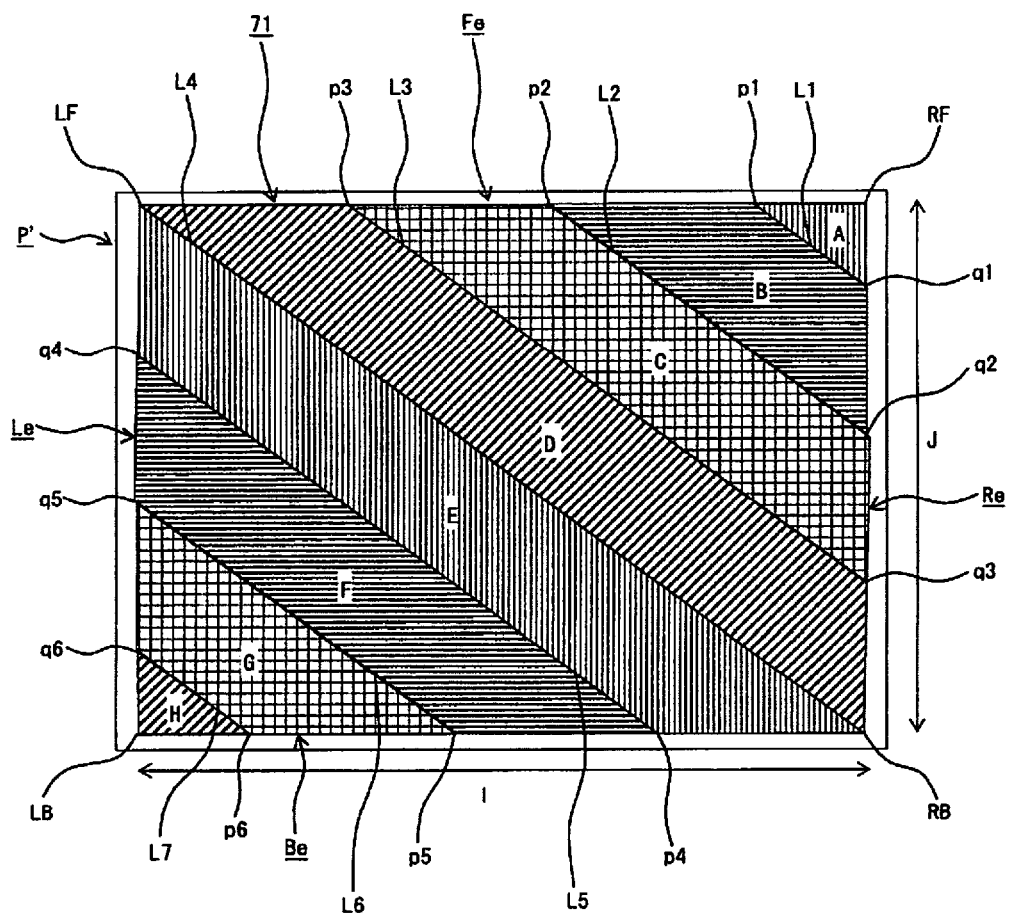
FIG. 4 is a diagram illustrating a first example of a test pattern image according to the first embodiment of the invention.

FIG. 4 is a diagram illustrating a first example of a test pattern image in the first embodiment of the invention.

In FIG. 4, P' indicates the paper and 71 indicates the test pattern image formed on paper P'. Here, in printer 11 (FIG. 2), a direction orthogonal to the transport direction of paper P' is the main scanning direction and the transport direction of paper P' is the sub-scanning direction. Then, test pattern image 71 has width I in the main scanning direction and width J in the sub-scanning direction.

Test pattern image 71 is divided into multiple, eight in this embodiment, adjacent regions A to H in the main scanning direction and in the sub-scanning direction by multiple, seven in this embodiment, imaginary lines L1 to L7 as boundaries which are set to incline at an equal pitch and be parallel to each other.

More specifically, in test pattern image 71, a corner of the right front end is indicated as RF, a corner of the right back end is indicated as RB, a corner of the left front end is indicated as LF, a corner of the left back end is indicated as LB, the front edge is indicated as Fe, the back edge is indicated as Be, the right edge is indicated as Re, and the left edge is indicated as Le. In this case, front edge Fe, back edge Be, right edge Re, and left edge Le are equally divided into four by points p1 to p3, points p4 to p6, points q1 to q3, and points q4 to q6, respectively. Then, imaginary line L1, imaginary line L2, imaginary line L3, imaginary line L4, imaginary line L5, imaginary line L6, and imaginary line L7 connect points p1 and q1, points p2 and q2, points p3 and q3, corners LF and RB, points p4 and q4, points p5 and q5, and points p6 and q6, respectively. As the result, regions A to H are formed. Thus, as illustrated in FIG. 4, regions A and H have a triangular shape with corners RF and LB as their vertices, respectively. Each of the regions B to G is formed between regions A and H, and is inclined to extend from the left front side to the right back side while having a belt-like trapezoid shape.

Then, a divided image is formed on each of regions A to H by one preset image formation unit out of image formation units 12Bk, 12Y, 12M, and 12C. In the embodiment, half-tone divided images by image formation unit 12Bk are formed on regions A and E, half-tone divided images by image formation unit 12Y are formed on regions B and F, half-tone divided images by image formation unit 12M are formed on regions C and G, and half-tone divided images by image formation unit 12C are formed on regions D and H. The half-tone images are uniformly formed by the toner of each color.

In this case, since the divided images are independently formed by image formation units 12Bk, 12Y, 12M, and 12C, the manipulator can recognize which image formation unit has a defect only by checking the divided images of test pattern image 71.

In addition, the two divided images formed by each of the image formation units 12Bk, 12Y, 12M, and 12C are formed to cover the entire width I in the main scanning direction and entire width J in the sub-scanning direction.

To be more specific, when the widths in the main scanning direction of the two divided images formed on regions A and E by image formation unit 12Bk are Ia and Ie, the widths in the main scanning direction of the two divided images formed on regions B and F by image formation unit 12Y are Ib and If, the widths in the main scanning direction of the two divided images formed on regions C and G by image formation unit 12M are Ic and Ig, and the widths in the main scanning direction of the two divided images formed on regions D and H by image formation unit 12C are Id and Ih, the following relationships are established:

$Ia+Ie>I;$ $Ib+If>I;$ $Ic+Ig>I;$ and $Id+Ih>I.$

Moreover, when the widths in the sub-scanning direction of the two divided images formed on regions A and E by image formation unit 12Bk are Ja and Je, the widths in the sub-scanning direction of the two divided images formed on regions B and F by image formation unit 12Y are Jb and Jf, the widths in the sub-scanning direction of the two divided images formed on regions C and G by image formation unit 12M are Jc and Jg, and the widths in the sub-scanning direction of the two divided images formed on regions D and H by image formation unit 12C are Jd and Jh, the following relationships are established:

$$Ja+Je>J;$$

$$Jb+Jf>J;$$

$$Jc+Jg>J;\text{ and}$$

$$Jd+Jh>J.$$

Therefore, even if the image quality degrades in the end portions of the divided images in the main scanning direction and sub-scanning direction, the manipulator can surely recognize which image formation unit has a defect.

In the embodiment, A4 paper is used as paper P' for image diagnosis. Width I in the main scanning direction of test pattern image 71 is a maximum width on which printer 11 can perform printing, and is set to a value obtained by subtracting the length of a margin from the length of the long side of the A4 paper (a length of the short side of an A3 paper). Here, when Letter paper is usually used in printer 11, width I in the main scanning direction of test pattern image 71 can be set to a value obtained by subtracting the length of a margin from the length of the long side of the Letter paper.

In addition, width J in the sub-scanning direction of test pattern image 71 is set as:

$$J>Jr(n),$$

where Jr(n) denotes a width in the sub-scanning direction of an image formed during a predetermined number n of revolutions or more of the inspection target roller in printer 11 having the largest rotation period for image formation among the inspection target rollers such as photoreceptor drum 13, charge roller 14, development roller 16, toner supply roller 18, transfer roller 27, heat roller 38, and pressure roller 39.

In the embodiment, photoreceptor drum 13 is the roller having the largest rotation period among the inspection target rollers. Since photoreceptor drum 13 forms test pattern image 71 with two revolutions or more, width J in the sub-scanning direction of test pattern image 71 is set to be larger than width Jr(2) of the image formed with two revolutions or more of photoreceptor drum 13, i.e., width J is set as J>Jr(2).

Thus, since photoreceptor drum 13 having the largest rotation period can be rotated by two revolutions or more to form test pattern image 71, a cause for a periodic degradation in the image quality can be identified.

In the embodiment, four image formation units 12Bk, 12Y, 12M, and 12C are arranged in printer 11. The entire width I in the main scanning direction and the entire width J in the sub-scanning direction are covered by the two divided images, and test pattern image 71 is divided into eight regions A to H. To put it in general terms, when g image formation units are arranged in printer 11, and the entire width I in the main scanning direction and the entire width J in the sub-scanning direction are covered by not less than h (≥2) divided images, test pattern image 71 is divided into h·g regions.

Incidentally, the two divided images can be set as below without overlapping in the main scanning direction:

$$Ia+Ie=I;$$

$$Ib+If=I;$$

$$Ic+Ig=I;\text{ and}$$

$$Id+Ih=I,\text{ whereas}$$

the two divided images can be set as below without overlapping in the sub-scanning direction:

$$Ja+Je=J;$$

$$Jb+Jf=J;$$

$$Jc+Jg=J;\text{ and}$$

$$Jd+Jh=J.$$

In the first example, test pattern image 71 is divided by seven imaginary lines L1 to L7 into eight regions A to H having the triangular and trapezoid shapes. However, test pattern image 71 may be modified and be divided into multiple regions having a rectangular shape.

Figure 5:
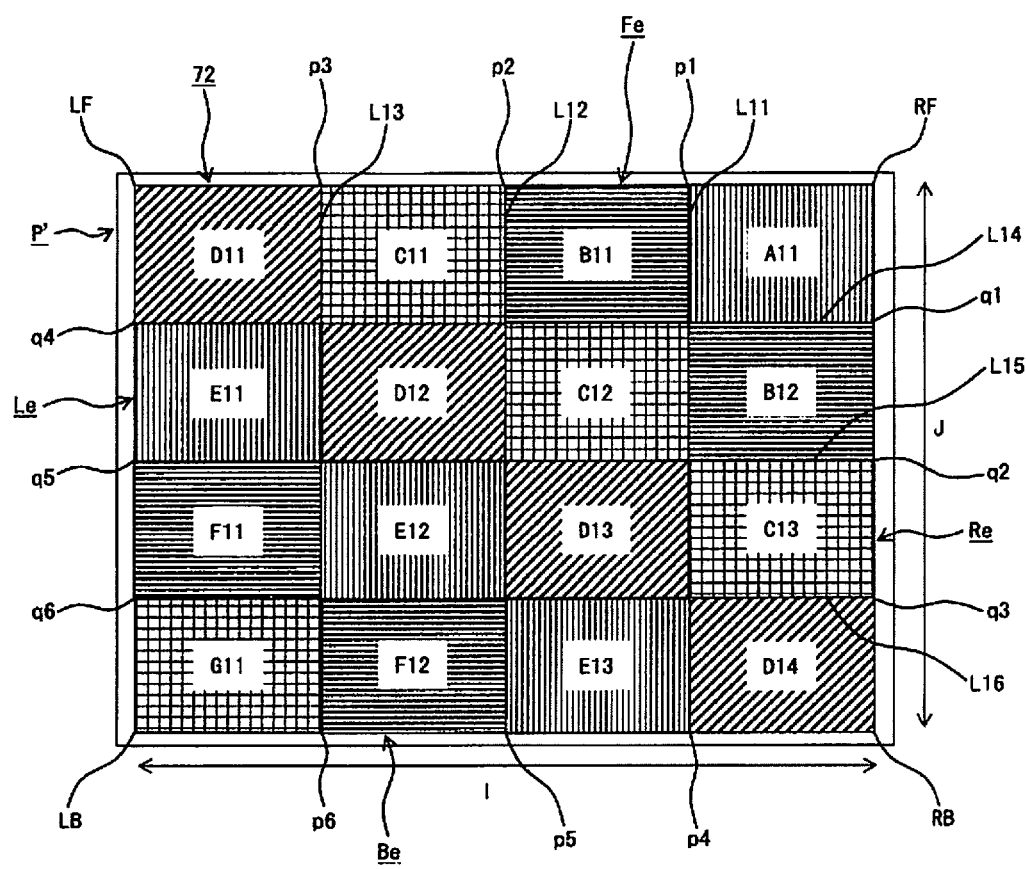
FIG. 5 is a diagram illustrating a second example of a test pattern image according to the first embodiment of the invention.

FIG. 5 is a diagram illustrating a second example of a test pattern image in the first embodiment of the invention.

In FIG. 5, P' indicates paper and 72 indicates a test pattern image formed on paper P'.

Test pattern image 72 is divided into multiple, 16 in this embodiment, regions A11, B11, B12, C11 to C13, D11 to D14, E11 to E13, F11, F12, and G11 in the main scanning direction and in the sub-scanning direction by multiple, three in this embodiment, imaginary lines L11 to L13 as boundaries which are set to extend in the sub-scanning direction and be parallel to each other, and by multiple, three in this embodiment, imaginary lines L14 to L16 as boundaries which are set to extend in the main scanning direction and be parallel to each other.

More specifically, in test pattern image 72, a corner of the right front end is indicated as RF, a corner of the right back end is indicated as RB, a corner of the left front end is indicated as LF, a corner of the left back end is indicated as LB, the front edge is indicated as Fe, the back edge is indicated as Be, the right edge is indicated as Re, and the left edge is indicated as Le. In this case, front edge Fe, back edge Be, right edge Re, and left edge Le are equally divided into four parts by points p1 to p3, points p4 to p6, points q1 to q3, and points q4 to q6, respectively. Then, imaginary line L11, imaginary line L12, imaginary line L13, imaginary line L14, imaginary line L15, and imaginary line L16 connect points p1 and p4, points p2 and p5, points p3 and p6, points q1 and q4, points q2 and q5, and points q3 and q6, respectively. As the result, regions A11, B11, B12, C11 to C13, D11 to D14, E11 to E13, F11, F12, and G11 are formed. Thus, regions A11, B11, B12, C11 to C13, D11 to D14, E11 to E13, F11, F12, and G11 are arranged in a matrix of four adjacent regions in the main scanning direction by four adjacent regions in the sub-scanning direction, and each has a rectangular shape.

Then, half-tone divided images are formed by image formation unit 12Bk (FIG. 2) on regions A11 and E11 to E13, half-tone divided images are formed by image formation unit 12Y on regions B11, B12, F11, and F12, half-tone divided images are formed by image formation unit 12M on regions C11 to C13 and G11, and half-tone divided images are formed by image formation unit 12C on regions D11 to D14.

In this case, regions A11, B11, B12, C11 to C13, D11 to D14, E11 to E13, F11, F12, and G11 are arranged such that two regions B11 and B12, three regions C11 to C13, four regions D11 to D14, three regions E11 to E13, and two regions F11 and F12 are inclined to extend from the left front side to the right back side in order that divided images formed by each of the image formation units can be located at different positions in each of the main scanning direction and the sub-scanning direction.

As similar to the case of test pattern image 71, the divided images in this case formed by each of image formation units 12Bk, 12Y, 12M, and 12C cover the entire width I in the main scanning direction and the entire width J in the sub-scanning direction.

To be more specific, when the widths in the main scanning direction of the four divided images formed on regions A11 and E11 to E13 by image formation unit 12Bk are Ia11 and Ie11 to Ie13, the widths in the main scanning direction of the four divided images formed on regions B11, B12, F11 and F12 by image formation unit 12Y are Ib11, Ib12, If11, and If12, the widths in the main scanning direction of the four divided images formed on regions C11 to C13 and G11 by image formation unit 12M are Ic11 to Ic13 and Ig11, and the widths in the main scanning direction of the four divided images formed on regions D11 to D14 by image formation unit 12C are Id11 to Id14, the widths are set as below:

$$Ia11+Ie11+Ie12+Ie13=I;$$

$$Ib11+Ib12+If11+If12=I;$$

$$Ic11+Ic12+Ic13+Ig11=I; \text{ and}$$

$$Id11+Id12+Id13+Id14=I.$$

Moreover, when the widths in the sub-scanning direction of the four divided images formed on regions A11 and E11 to E13 by image formation unit 12Bk are Ja11 and Je11 to Je13, the widths in the sub-scanning direction of the four divided images formed on regions B11, B12, F11 and F12 by image formation unit 12Y are Jb11, Jb12, Jf11, and Jf12, the widths in the sub-scanning direction of the four divided images formed on regions C11 to C13 and G11 by image formation unit 12M are Jc11 to Jc13 and Jg11, and the widths in the sub-scanning direction of the four divided images formed on regions D11 to D14 by image formation unit 12C are Jd11 to Jd14, the widths are set as below:

$$Ja11+Je11+Je12+Je13=J;$$

$$Jb11+Jb12+Jf11+Jf12=J;$$

$$Jc11+Jc12+Jc13+Jg11=J; \text{ and}$$

$$Jd11+Jd12+Jd13+Jd14=J.$$

In this connection, when fuser unit 37 (FIG. 2) has a defect, the image quality may degrade on any of the boundaries between the 16 regions of test pattern image 72: A11, B11, B12, C11 to C13, D11 to D14, E11 to E13, F11, F12, and G11, that is, on imaginary lines L11 to L16, for example. In this case, it is difficult to recognize which part of printer 11 has a defect even by checking each of the divided images.

To address this, an example of the test pattern image obtained by modifying test pattern image 72 is described.

Figure 6:
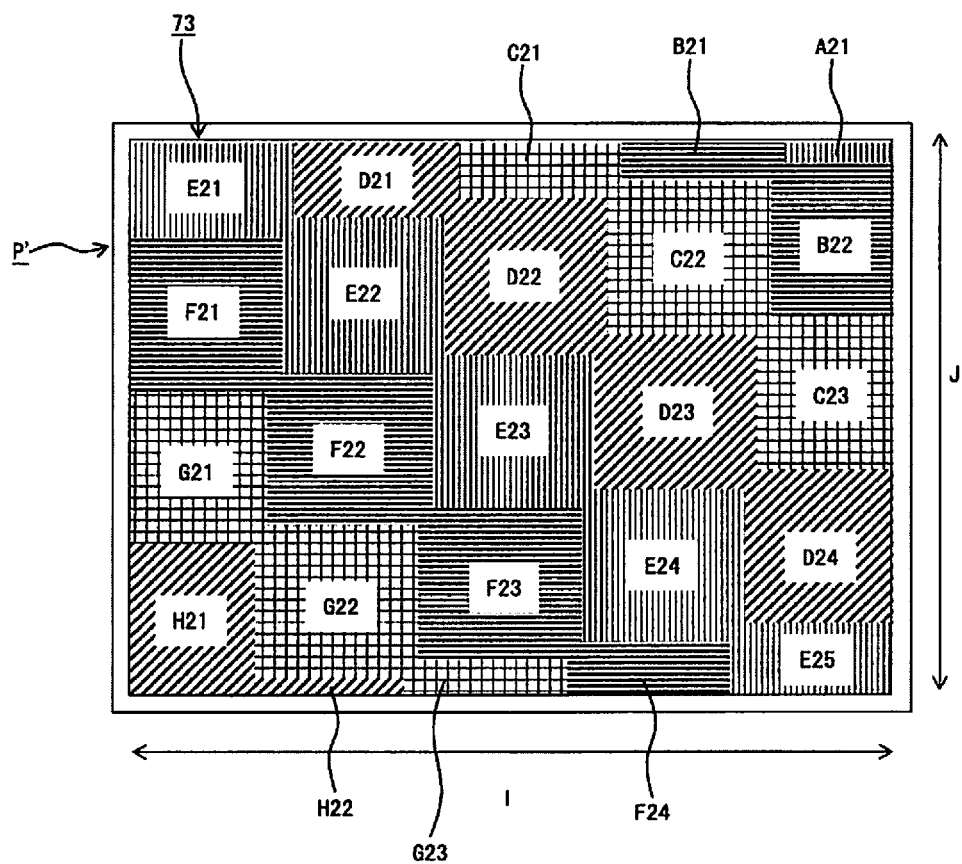
FIG. 6 is a diagram illustrating a third example of a test pattern image according to the first embodiment of the invention.

FIG. 6 is a diagram illustrating a third example of a test pattern image in the first embodiment of the invention.

In FIG. 6, P' indicates paper and 73 indicates a test pattern image formed on paper P'.

Test pattern image 73 includes divided images formed on multiple, 24 in this embodiment, regions A21, B21, B22, C21 to C23, D21 to D24, E21 to E25, F21 to F24, G21 to G23, H21, and H22 which are divided by multiple imaginary lines as boundaries extended in the main scanning direction and multiple imaginary lines as boundaries extended in the sub-scanning direction. Half-tone divided images by image formation unit 12Bk are formed on regions A21 and E21 to E25, half-tone divided images by image formation unit 12Y are formed on regions B21, B22, and F21 to F24, half-tone divided images by image formation unit 12M are formed on regions C21 to C23 and G21 to G23, and half-tone divided images by image formation unit 12C are formed on regions D21 to D24, H21, and H22.

In this case, five regions are formed adjacent to each other in the main scanning direction and are shifted from each other by a predetermined amount in the sub-scanning direction. In addition, four or five regions are formed adjacent to each other in the sub-scanning direction, and are shifted from each other by a predetermined amount in the main scanning direction.

For example, five regions B22, C22, D22, E22, and F21 are formed adjacent to each other in the main scanning direction and regions C22, D22, E22, and F21 are shifted backward in the sub-scanning direction from regions B22, C22, D22, and E22, respectively. Then, five regions B21, C22, D23, E24, and F24 are formed adjacent to each other in the sub-scanning direction, and regions C22, D23, E24, and F24 are shifted leftward in the main scanning direction from regions B21, C22, D23, and E24, respectively.

Accordingly, since the adjacent regions are shifted by the predetermined amount in test pattern image 73, the manipulator can recognize which part of printer 11 has a defect only by checking the divided images even in the case where the image quality of test pattern image 73 degrades on the boundaries between the regions.

Next, an operation of printer 11 for the image diagnosis by printing test pattern 64 on paper P' is described. Here, the description is provided for the case of forming test pattern image 71 on paper P' by printing test pattern 64.

Figure 7:
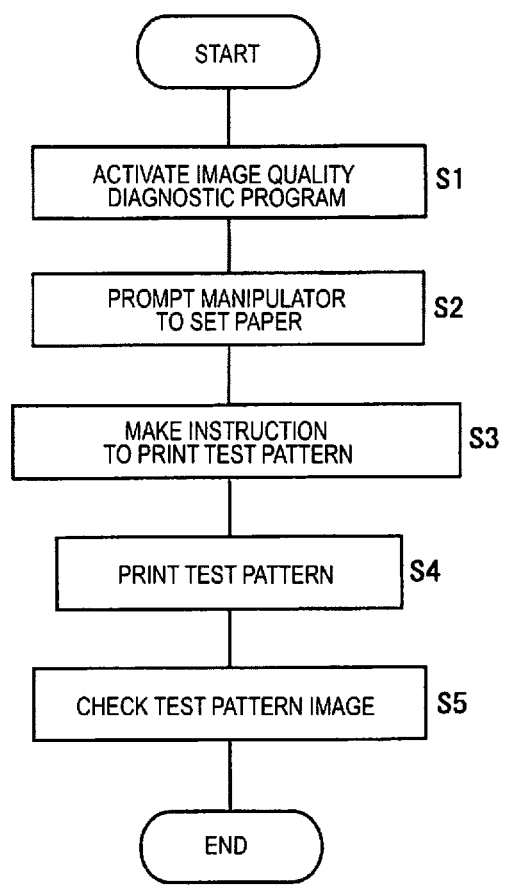
FIG. 7 is a flowchart illustrating an operation of the printer according to the first embodiment of the invention.

FIG. 7 is a flowchart illustrating an operation of the printer in the first embodiment of the invention.

First, the flowchart is described:
Step S1 The manipulator activates image quality diagnostic program d3;
Step S2 Controller 51 prompts the manipulator to set paper P';
Step S3 The manipulator makes an instruction to print test pattern 64;
Step S4 Controller 51 prints test pattern 64; and
Step S5 The manipulator checks test pattern image 71 and ends the processing.

If the manipulator recognizes a degradation in the image quality in an image formed on paper P, the manipulator activates image quality diagnostic program d3 stored in storage 63 by manipulating operation panel 62 (FIG. 1). Thus, the procedure of forming test pattern image 71 is shown on the display of operation panel 62 and the manipulator makes the printing by following the procedure.

More specifically, controller 51 prompts the manipulator to load and set paper P' for image diagnosis on manual feed tray 24. During this step, the setting contents of print setting information d2 are shown on the display of operation panel 62.

In accordance with the contents of print setting information d2, the manipulator loads and sets A4 paper P' in a landscape orientation on manual feed tray 24. Note that even if the normal printing is set to perform on paper P stored in paper cassette Ca, test pattern 64 is printed on A4 paper P' loaded and set in the landscape orientation on manual feed tray 24.

Subsequently, when the manipulator manipulates operation panel 62 in accordance with the procedure to make the instruction to print test pattern 64, controller 51 reads out test chart data d1 and print setting information d2 from storage 63, picks up paper P' from manual feed tray 24, and prints test pattern 64.

Then, the manipulator checks test pattern image 71 on paper P' delivered from printer 11.

Next, a first example of test pattern image 71 obtained by printing test pattern 64 is described.

Figure 8:
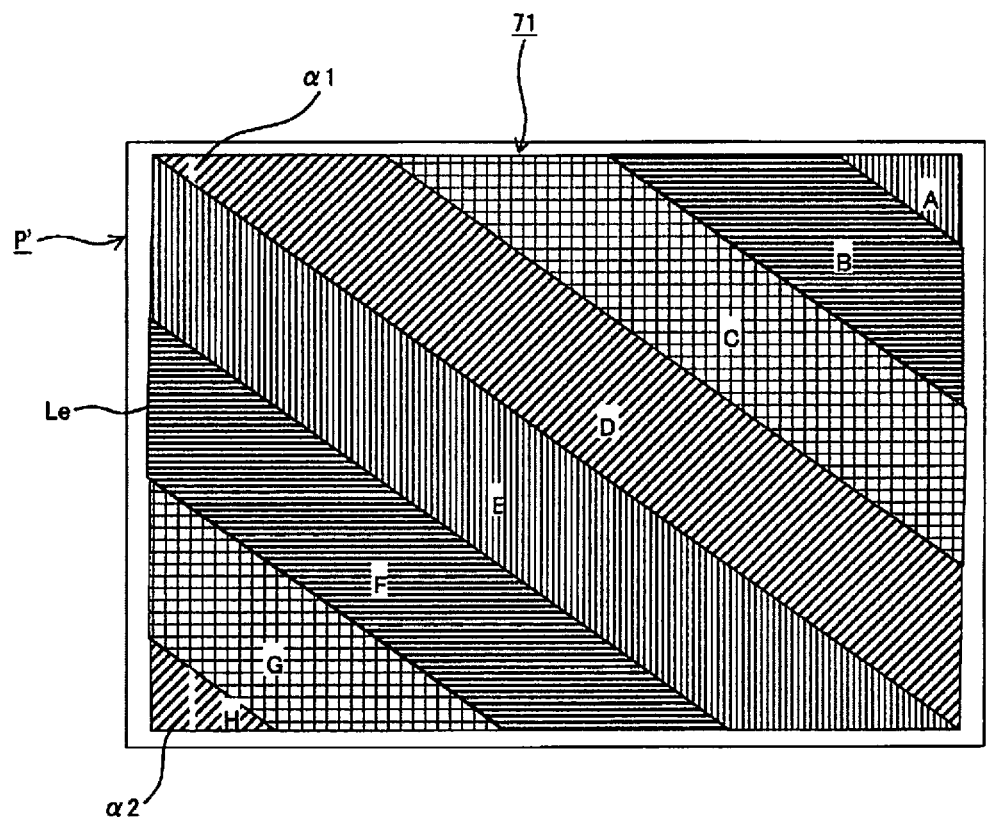
FIG. 8 is a diagram illustrating a first example of a test pattern image which is obtained by printing the test pattern according to the first embodiment of the invention.

FIG. 8 is a diagram illustrating the first example of the test pattern image which is obtained by printing the test pattern in the first embodiment of the invention.

In FIG. 8, P' indicates paper and 71 indicates a test pattern image formed on paper P'. Test pattern image 71 includes divided images dividedly formed on eight regions A to H.

In this case, there are no degradations in the image quality on the divided images formed on regions A to C and E to G; however, white streaks $\alpha 1$ and $\alpha 2$ occur in parts of the divided images of regions D and H near left edge Le.

In most cases, white streaks $\alpha 1$ and $\alpha 2$ occur because of the adhesion of toner T and the like to LED head 15. For this reason, only by checking test pattern image 71, the manipulator can know the necessity to clean LED head 15 of image formation unit 12C.

Alternatively, use of test pattern image 71 enables, for example, the manipulator to report a printing defect to a remote support center by sending test pattern image 71, and then receive an instruction, such as one to clean LED head 15, from a staff member at the support center.

Note that, since the set orientation of paper P' in manual feed tray 24 is set to the landscape orientation, paper P' can be inhibited from being set in a portrait orientation in manual feed tray 24, and test pattern image 71 can also be inhibited from being printed on paper P' set in the portrait orientation.

Moreover, since test pattern 64 is not printed on paper P stored in paper cassette Ca, test pattern image 71 is not formed on paper P for the normal printing. Therefore, no paper P is wasted.

Next, a second example of test pattern image 71 which is obtained by printing test pattern 64 is described.

Figure 9:
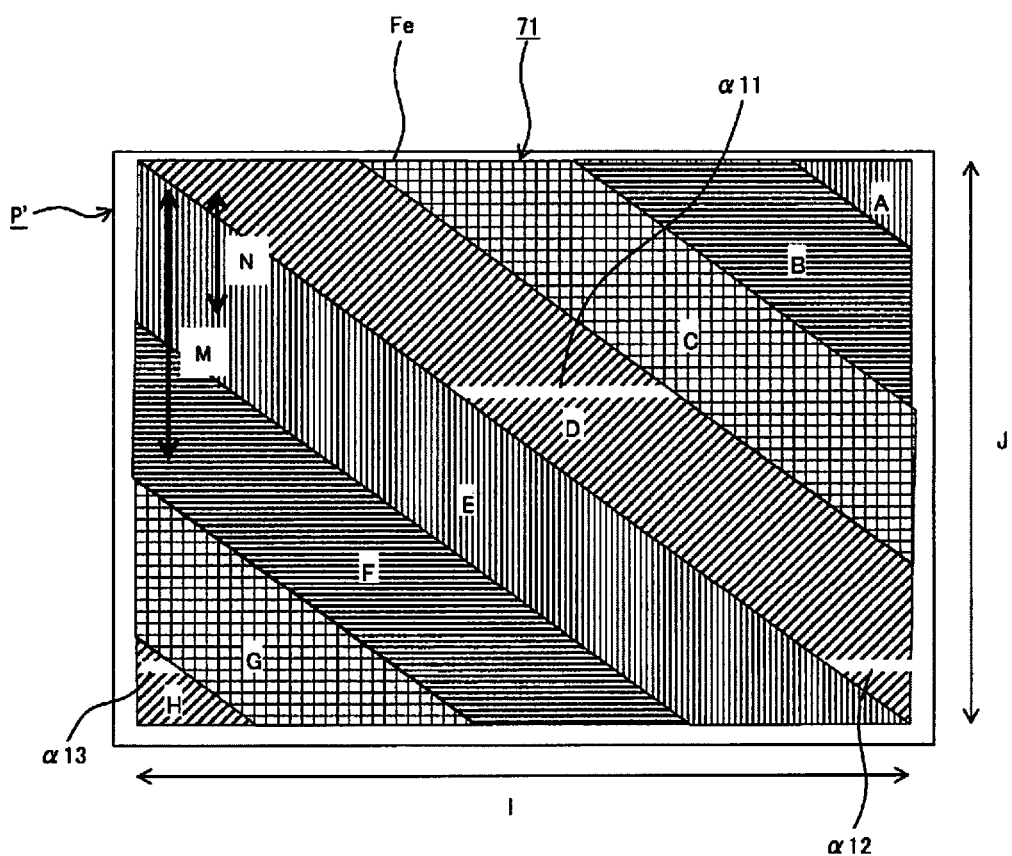
FIG. 9 is a diagram illustrating a second example of a test pattern image which is obtained by printing the test pattern according to the first embodiment of the invention.

FIG. 9 is a diagram illustrating the second example of the test pattern image which is obtained by printing the test pattern in the first embodiment of the invention.

In FIG. 9, P' indicates paper and 71 indicates a test pattern image formed on paper P'. Test pattern image 71 includes divided images dividedly formed on eight regions A to H.

In this case, there are no degradations in the image quality on the divided images formed on regions A to C and E to G; however, horizontal bands $\alpha 11$ to $\alpha 13$ occur on the divided images of regions D and H.

Horizontal bands $\alpha 11$ to $\alpha 13$ occur for the following reason, for example. Specifically, when the manipulator replaces consumables such as toner cartridge 17 or removes paper P from the apparatus main body at the occurrence of a paper jam, the manipulator may take out, for example, image formation unit 12C from the apparatus main body, and leave image formation unit 12C in the light for a longtime. This decreases the sensitivity of part of photoreceptor drum 13 exposed to the light, and resultantly lowers the density in band-shaped parts of regions D and H, so that horizontal bands $\alpha 11$ to $\alpha 13$ occur.

In test pattern image 71 in FIG. 9, horizontal band $\alpha 12$ in the divided image of region D and horizontal band $\alpha 13$ in the divided image of region H are formed in the same position in the sub-scanning direction, which is backwards at a predetermined distance from front edge Fe of test pattern image 71. A distance between horizontal bands $\alpha 11$ and $\alpha 12$ formed on the divided image of region D is equal to rotation period M of photoreceptor drum 13.

Therefore, only by checking test pattern image 71, the manipulator can know the necessity to replace image formation unit 12C.

Incidentally, in FIG. 9, N indicates a rotation period of charge roller 14.

In this way, in the embodiment, width J of test pattern image 71 in the sub-scanning direction is set to be two or more times larger than rotation period M of photoreceptor drum 13. The manipulator can recognize a periodical degradation in the image quality of test pattern image 71 only by checking test pattern image 71.

In addition, in the embodiment, the formation of the half-tone divided images on regions A to H makes it possible to surely recognize a degradation in the image quality of test pattern image 71 also in the case where density unevenness occurs on test pattern image 71.

For example, if solid divided images are formed on regions A to H, one can recognize which part of test pattern image 71 has a degradation in the image quality only by checking test pattern image 71 in the case where the divided images have lower-density parts where white streaks $\alpha 1$ and $\alpha 2$, horizontal bands $\alpha 11$ to $\alpha 13$, and the like occur. However, in the case where the divided images have higher-density parts, one cannot recognize which part of the test pattern image 71 has a degradation in the image quality even by checking test pattern image 71.

Meanwhile, in the case where the white streaks occur on the divided images of predetermined regions D and H formed by a certain one of the image formation units, for example, image formation unit 12C, the manipulator can recognize that image formation unit 12C has a printing defect only by checking test pattern image 71. However, in the case where a mixed color streak occurs not on the divided image of a specific region, but from front edge Fe to back edge Be throughout the entire test pattern image 71, one can recognize that a printing defect occurs not in a specific image formation unit, but in fuser unit (FIG. 2).

As described above, in the embodiment, test pattern image 71 includes the divided images formed by being divided into multiple regions A to H in the main scanning direction and sub-scanning direction, and each divided image is formed by a preset one of image formation units 12Bk, 12Y, 12M, and 12C. Thus, the manipulator can easily recognize which part of printer 11 has a defect only by checking test pattern image 71.

In addition, since the widths in the main scanning direction and sub-scanning direction of the divided images formed by each of the image formation units 12Bk, 12Y, 12M, and 12C are set to cover the entireties of the corresponding widths of test pattern image 71, the manipulator can surely recognize which part of printer 11 has a defect.

Moreover, for example, when the manipulator reports a printing defect and sends test pattern image 71 to a remote support center, the manipulator can receive an instruction, such as one to clean LED head 15, from a staff member at the support center.

Here, consider a case where, for example, image formation unit 12Y is left in the light for a long time, a part of photoreceptor drum 13 of image formation unit 12Y this is exposed to the light is decreased in sensitivity, and horizontal bands occur due to a lowering of the density in band-shaped parts of the divided images of regions B and F. In this case, as for the yellow color, it may be difficult for the manipulator's eyes to determine whether the image has a part with a lower density, if the density difference between the low-density part and its surroundings is small. In this case, it is difficult for the manipulator to recognize which part of the image has the degradation in the image quality even by checking test pattern image 71.

In this regard, a second embodiment of the invention is described. In the second embodiment, even when a divided image is formed with a color for which it is difficult to determine whether the density is lowered or not, which part of the divided image has a degradation in the image quality can still be recognized. Note that a component that has the same structure with the component in the first embodiment is given the same reference numeral, and the second embodiment also makes use of the effect of the first embodiment in the invention attributed to the same structure.

Figure 10:
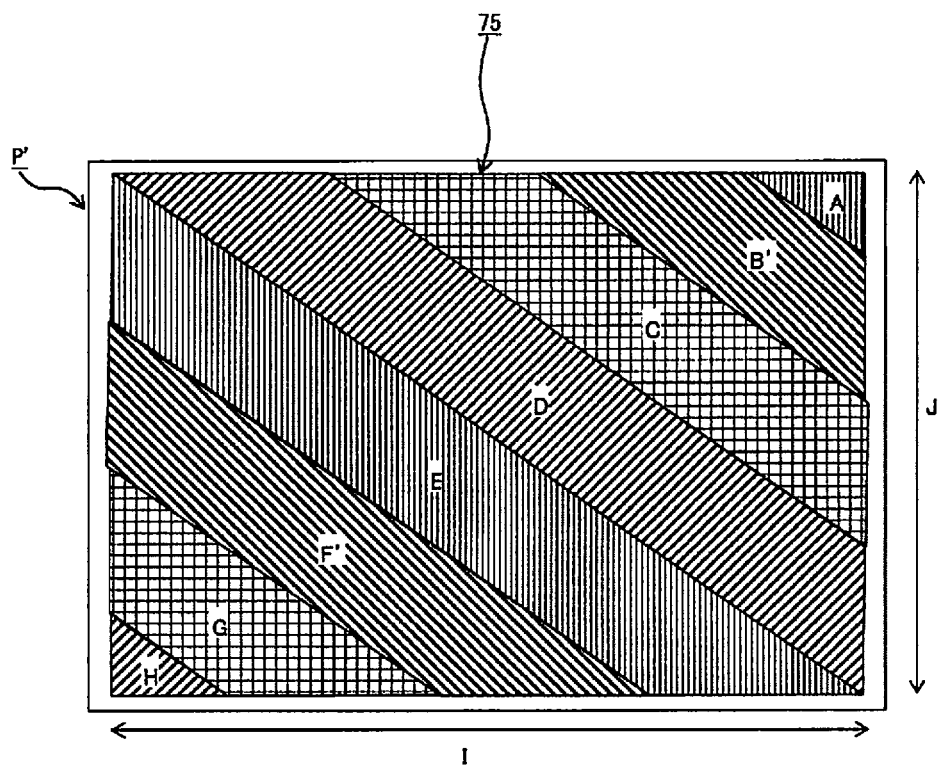
FIG. 10 is a diagram illustrating a test pattern image according to a second embodiment of the invention.

FIG. 10 is a diagram illustrating a test pattern image in the second embodiment of the invention.

In FIG. 10, P' indicates paper as a medium and 75 indicates a test pattern image formed on paper P'.

Test pattern image 75 includes divided images dividedly formed on multiple, eight in this embodiment, adjacent regions A, B', C, D, E, F', G, and H.

Then, preset ones of image formation units 12Bk, 12Y, 12M, and 12C, which are two image formation units 12Y and 12C in the embodiment, form divided images on predetermined ones of regions A, B', C, D, E, F', G, and H, which are regions B' and F' in the embodiment.

More specifically, half-tone divided images by image formation unit 12Bk are formed on regions A and E, half-tone divided images of a mixed color by image formation units of specific colors, which are yellow and cyan image formation units 12Y and 12C in the embodiment, are formed on regions B' and F', half-tone divided images by image formation unit 12M are formed on regions C and G, and half-tone divided images by image formation unit 12C are formed on regions D and H.

Next, a first example of test pattern image 75 obtained by printing test pattern 64 (FIG. 1) is described.

Figure 11:
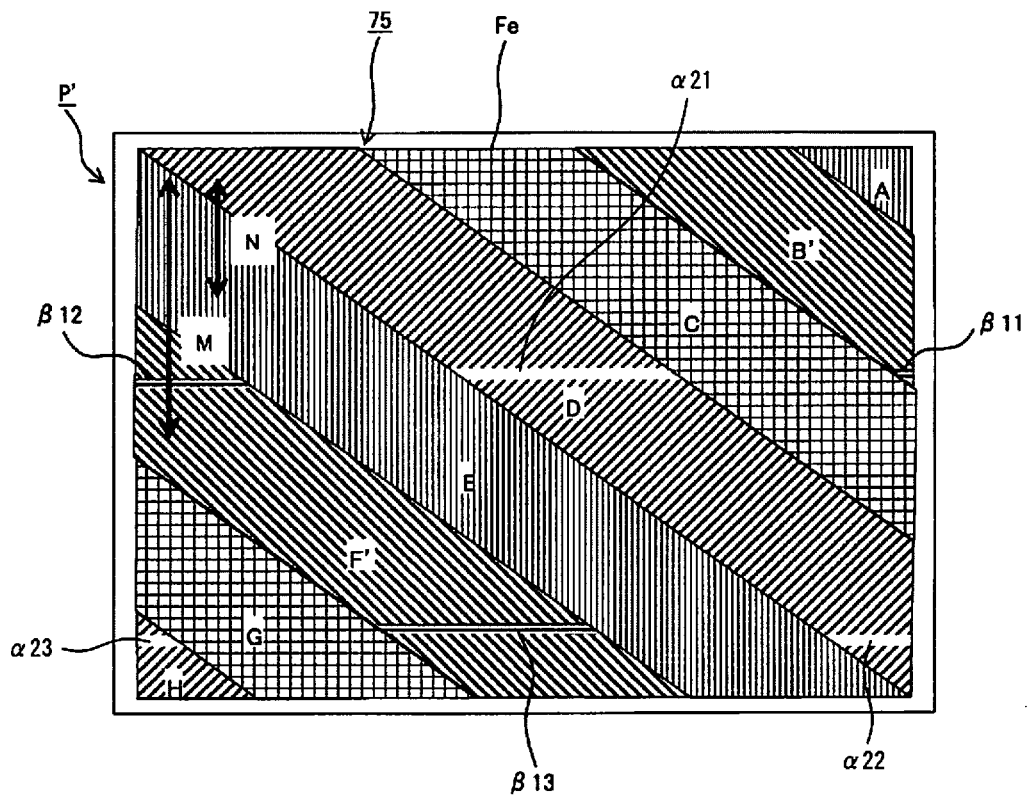
FIG. 11 is a diagram illustrating a first example of a test pattern image which is obtained by printing the test pattern according to the second embodiment of the invention.

FIG. 11 is a diagram illustrating the first example of the test pattern image which is obtained by printing the test pattern according to the second embodiment of the invention.

In FIG. 11, P' indicates paper and 75 indicates the test pattern image formed on paper P'.

In this case, since image formation unit 12C is taken out of the apparatus main body and is left in the light for a long time, horizontal bands $\alpha21$ to $\alpha23$ occur due to a lowering of the density in the band-shaped parts of the divided images of the regions D and H. Horizontal bands 31 to 33 also occur due to a lowering of the density in the band-shaped parts of the divided images of the regions B' and F' which are formed with the mixed colors by image formation units 12Y and 12C.

In test pattern image 75 of FIG. 11, horizontal band $\alpha22$ in the divided image of region D, horizontal band $\alpha23$ in the divided image of region H, and horizontal band $\beta3$ in the divided image of region F' are formed in the same position in the sub-scanning direction, which is backwards at a predetermined distance from front edge Fe of test pattern image 75. Further, horizontal band $\alpha21$ in the divided image of region D, horizontal band $\beta1$ in the divided image of region B', and horizontal band $\beta2$ in the divided image of region F' are formed in the same position in the sub-scanning direction, which is backwards at a predetermined distance from front edge Fe of test pattern image 75.

In addition, a distance between horizontal bands $\alpha21$ and $\alpha22$ formed in the divided image of region D and a distance between horizontal bands $\beta2$ and $\beta3$ formed in the divided image of region F' are equal to the rotation period M of photoreceptor drum 13 (FIG. 2) as an image carrier.

Here, the parts of horizontal bands $\beta1$ to $\beta3$ have a higher ratio of yellow than the other parts in the divided images of regions B' and F'.

Next, a second example is described of test pattern image 75 obtained by printing test pattern 64.

Figure 12:
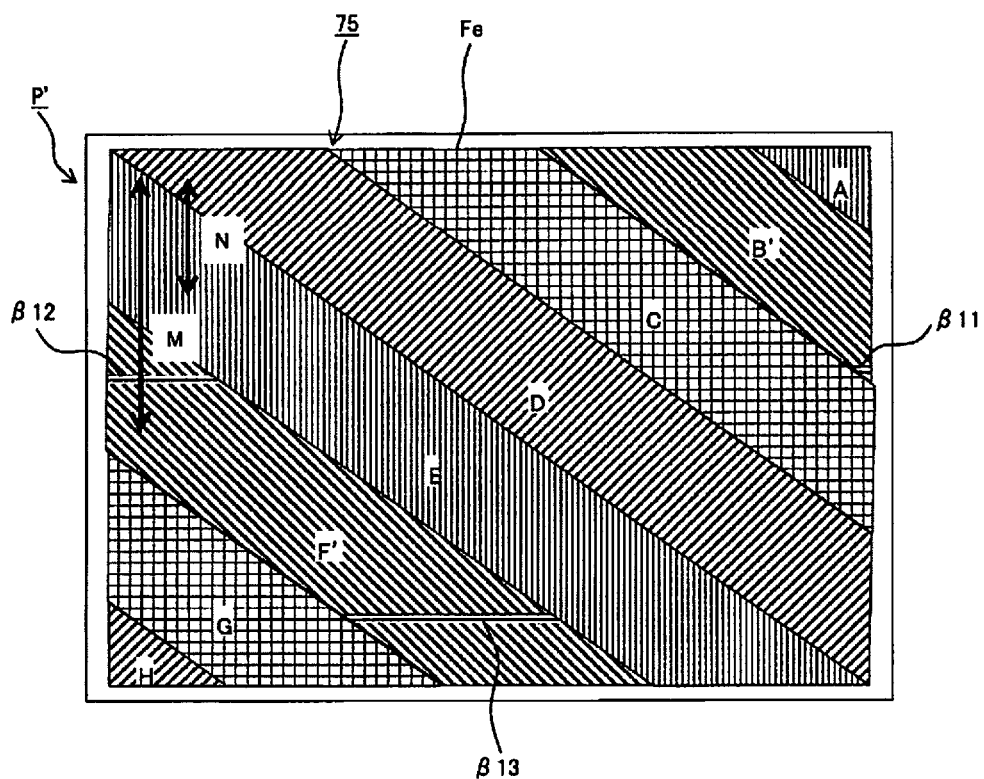
FIG. 12 is a diagram illustrating a second example of a test pattern image which is obtained by printing the test pattern according to the second embodiment of the invention.

FIG. 12 is a diagram illustrating the second example of the test pattern image which is obtained by printing the test pattern in the second embodiment of the invention.

In FIG. 12, P' indicates paper and 75 indicates the test pattern image formed on paper P'.

In this case, since image formation unit 12Y is taken out of the apparatus main body and is left in the light for a long time, horizontal bands $\beta11$ to $\beta13$ occur due to a lowering of the density in the band-shaped parts of the divided images of regions B' and F', which are formed with the mixed colors by image formation units 12Y and 12C.

In test pattern image 75 of FIG. 12, horizontal band $\beta11$ in the divided image of region B' and horizontal band $\beta12$ in the divided image of region F' are formed in the same position in the sub-scanning direction, which is backwards at a predetermined distance from front edge Fe of test pattern image 75.

In addition, a distance between horizontal bands $\beta12$ and $\beta13$ formed in the divided image of region F' is equal to rotation period M of photoreceptor drum 13.

Here, the parts of horizontal bands $\beta11$ to $\beta13$ have a higher ratio of cyan than the other parts in the divided images of regions B' and F'.

Thus, in the embodiment, since the divided images are formed with a mixed color, the manipulator can easily recognize which part of test pattern image 75 has a degradation in the image quality even in the case where the image quality of test pattern image 75 degrades in a color, such as for example yellow, for which it is difficult for human eyes to make the above determination.

Although printer 11 which forms a color image by using toners of four colors: black, yellow, magenta, and cyan is described in the above embodiments, the invention may be applied to a printer which forms an image by using any toners of special colors such as gold, silver, white, and clear.

In addition, although printer 11 is described in the above embodiments, the invention may be applied to any image formation apparatus such as a copier, a facsimile, and a multifunction peripherals.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:
1. An image formation apparatus comprising:
a storage; and
a plurality of image formation sections each comprising plural rotation members, wherein
a test pattern is stored in the storage;
the plural rotation members form an image of the test pattern on a medium,
the image of the test pattern comprises divided images formed by being divided into regions in a main scanning direction and a sub-scanning direction, each of the divided images is formed by at least one preset image formation section out of the image formation sections, and
a width in each of the main scanning direction and the sub-scanning direction of the divided images formed by each of the image formation sections covers the entirety of a width of the image of the test pattern, wherein
the width of the image of the test pattern in the sub-scanning direction is larger than a width of an image in the sub-scanning direction formed during two or more revolutions of one of the plural rotation members having a rotation period for image formation larger than that for others of the plural rotation members.

2. The image formation apparatus according to claim 1, wherein the test pattern includes:
image data based on which the image of the test pattern is to be formed; and
print setting information based on which the medium is to be set.

3. The image formation apparatus according to claim 2, wherein the print setting information includes a size of the medium, a medium loading section on which the medium is to be set, and a set orientation of the medium.

4. The image formation apparatus according to claim 1, wherein each of the divided images is formed to incline from a transport direction of the medium.

5. The image formation apparatus according to claim 1, wherein each of the divided images has a belt-like shape.

6. The image formation apparatus according to claim 5, wherein each of the divided images is formed by dividing the image of the test pattern by imaginary lines which are set to incline from the transport direction of the medium and be parallel to each other.

7. The image formation apparatus according to claim 4, wherein each of the divided images is formed by dividing the image of the test pattern by imaginary lines which are set to extend in the main scanning direction and be parallel to each other, and imaginary lines which are set to extend in the sub-scanning direction and be parallel to each other.

8. The image formation apparatus according to claim 7, wherein the divided images are formed adjacent to each other and shifted from each other by a predetermined amount in each of the main scanning direction and the sub-scanning direction.

9. The image formation apparatus according to claim 1, wherein each of the divided images is formed by a preset one of the image formation sections.

10. The image formation apparatus according to claim 1, wherein at least one of the divided images is formed by two or more preset ones of the image formation sections.

11. The image formation apparatus according to claim 1, wherein each of the divided images is formed in half-tone.

12. The image formation apparatus according to claim 1, further comprising:
a display; and
medium loading sections, wherein
each of the medium loading sections is provided upstream of the image formation sections and on each of the medium loading sections a medium is to be set,
the display displays predetermined notification information, and
in forming the image of the test pattern on the medium, the display displays a notification of a medium loading section on which the medium is to be set and a set orientation of the medium.

13. The image formation apparatus according to claim 1, wherein the plural rotation members comprise a photoreceptor drum, a charge roller, a development roller, a developer supply roller, wherein the photoreceptor drum has the largest rotation period for image formation among the plural rotation members.

14. An image formation method comprising:
reading a test pattern stored in a storage; and
forming an image of the test pattern on a medium by image formation sections comprising plural rotation members, wherein
the image of the test pattern comprises divided images formed by being divided into regions in a first direction and in a second direction orthogonal to the first direction,
each of the divided images is formed by at least one preset image formation section out of the image formation sections,
a width of the divided images in the second direction formed by each of the image formation sections covers the entirety of a width of the image of the test pattern, and
the width of the image of the test pattern in the second direction is larger than a width in the second direction of an image formed during two or more revolutions of one of the plural rotation members having a rotation period for image formation larger than that for others of the plural rotation members.

15. The image formation method according to claim 14, wherein each of the divided images incline from a transport direction of the medium.

16. The image formation method according to claim 14, wherein each of the divided images has a belt-like shape.

17. The image formation method according to claim 16, wherein each of the divided images is formed by dividing the image of the test pattern according to imaginary lines that incline diagonally across the image of the test pattern and are parallel to each other.

18. The image formation method according to claim 15, wherein each of the divided images is formed by dividing the image of the test pattern according to imaginary lines extending in the first direction and parallel to each other, and imaginary lines extending in the second direction and parallel to each other.

19. The image formation method according to claim 18, wherein the divided images are formed adjacent to each other and shifted from each other by a predetermined amount in each of the first direction and the second direction.

20. The image formation method according to claim 14, wherein each of the divided images is formed in half-tone.

* * * * *